April 4, 1961  R. L. FLATRAY  2,977,682
SELF-LUBRICATION OF TURBINE-TYPE DENTAL HANDPIECES
Filed Aug. 3, 1959

INVENTOR.
RAYMOND L. FLATRAY,
BY
Attorney.

United States Patent Office 2,977,682
Patented Apr. 4, 1961

2,977,682

SELF-LUBRICATION OF TURBINE-TYPE DENTAL HANDPIECES

Raymond L. Flatray, Denver, Colo., assignor to Densco, Incorporated, Denver, Colo., a corporation of Colorado Filed Aug. 3, 1959, Ser. No. 831,133

6 Claims. (Cl. 32—27)

This invention relates to dental operating equipment as typified by handpieces conventionally employed for the manipulation and use application of powered instruments interchangeably associated therewith, and more particularly to handpieces of turbine type operatively reactive for drive of the associated instrument to fluid pressure supply, and has as an object to provide novel and improved means for automatic lubrication of the powering components of such turbine-type handpieces as an incident of their use.

A further object of the invention is to provide a novel and improved organization for turbine-type dental handpieces effective to automatically and continuously lubricate the powering components thereof as an incident of supply of actuating fluid pressure thereto.

A further object of the invention is to provide a novel and improved integration with conventional turbine-type dental handpieces of means for applying input of actuating fluid pressure to effect automatic and continuous lubrication of the powering components reactive to such pressure.

A further object of the invention is to provide means for the automatic and operatively synchronous lubrication of the powering components of conventional turbine-type dental handpieces in such integrated association therewith as maintains unimpaired and unaltered the conventional conformation and manipulative characteristics thereof.

A further object of the invention is to provide novel and improved means for the automatic lubrication of the powering components of turbine-type dental handpieces that is simple and inexpensive of production and use adaptation, that is amenable to operative association with conventional handpieces of diverse particularity, that is efficient in automatic operation through long periods of handpiece use, that is facile of but infrequent servicing, and that is positive and dependable in attainment of the ends for which designed.

With the foregoing and other objects in view, my invention consists in the construction, arrangement, and operative combination of elements as hereinafter set forth, pointed out in my claims, and illustrated by the accompanying drawing, in which—

Figure 1:
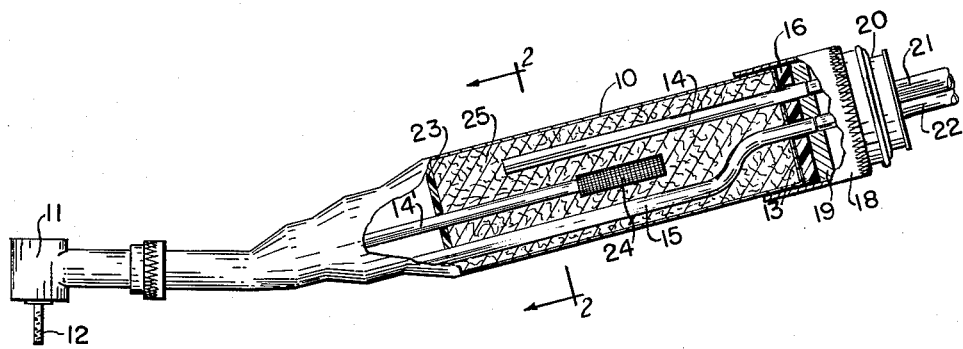
Figure 1 is a side elevation of a typical, conventional, turbine-type dental handpiece as organized in accordance with and to give effect to the principles of the invention, a portion of the handpiece barrel being broken away to expose otherwise concealed structural arrangements significant to realization of the invention.
Figure 2:
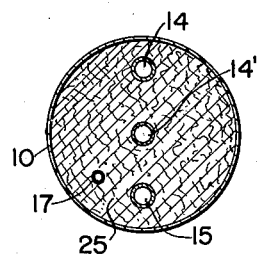
Figure 2 is a transverse section, on a relatively-enlarged scale, taken substantially on the indicated line 2—2 of Figure 1.
Figure 3:
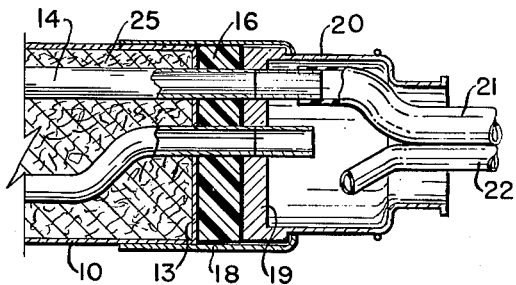
Figure 3 is a fragmentary, detail section, on the same scale as Figure 2, through and substantially axially of the elements at the right-hand end of the assembly according to Figure 1.

The advent and extensive popularity of turbine-powered dental handpieces characterized by a high-speed turbine at the operating end in direct driving relation with the dental instrument in reaction to pressure input of fluid, such as air, thereto through the grip, or barrel, of the handpiece have emphasized the importance of positively and efficiently lubricating the turbine components for counteraction of the frictions and heats generated thereby, and the instant invention is hence directed to the provision of means for automatically and continuously lubricating such components coincidentally with their use in a simple, dependable manner that in no way interferes with, or hampers, customary use and manipulation of the resulting handpiece assembly.

Typical of conventional such facilities diverse in form and structural particularity, a turbine-type dental handpiece is represented in the drawing as including the usual, tubular, elongated barrel portion 10 adapted to function as a grip for the manipulation of a head 11 detachably carried by a tapered neck extension of the barrel and housing a turbine, not shown, in actuating relation with an instrument 12 interchangeably engaged therewith. The end of the barrel 10 remote from the head 11 is sealclosed by a transverse web 13 through which engage the corresponding ends of a fluid pressure input line 14 and a fluid pressure return line 15 interiorly traversing the barrel in appropriate serving relation with the turbine in the head 11, which lines are fixed at their intersection with the web 13 and protrude exteriorly thereof as spaced nipples adapted to traverse the thickness of a resilient gasket 16 coextensive with and exteriorly against said web. A third line 17 for supply of coolant to the working tip of the instrument 12 is commonly accommodated through the web 13 and barrel 10, in which case said line 17 terminates in a nipple fixed through said web to traverse the gasket 16 in analogy with the nipple terminations of the lines 14 and 15. A cap 18 coacts through a bayonet-type joint, or the equivalent, with the end of the barrel 10 closed by the web 13 to detachably clamp thereto and into compressing relation with the gasket 16 the end-closure plate 19 of a thimble 20 carrying a fluid pressure supply line 21 and a coolant supply line 22 which terminate in sockets for the reception of the nipples terminating the lines 14 and 17, respectively, whereby to operatively intercouple the line 21 to the line 14 and the line 22 to the line 17 when the plate 19 is clamped by the cap 18 against the gasket 16; a socket for the reception of the nipple terminating the line 15 being provided in the plate 19 to vent outflow from said line to atmosphere through the thimble 20. All of the foregoing is but representative of conventional turbine-type dental handpieces whereto the principles of the instant invention may be advantageously applied and constitutes an organization effective when intercoupled as shown to apply fluid pressure supplied through the line 21 and its continuation 14 to power the turbine in driving relation with the instrument 12 and to exhaust the applied fluid through the line 15 and thimble 20.

Utilizing the environment of the conventional turbine-type dental handpiece as hereinabove exemplified, the principles of the instant invention are given practical effect through the provision of a baffle 23 transversely seal-closing and obstructing the interior of the barrel 10 in a maximum expedient spacing from the web 13, whereby to establish a closed chamber within the barrel between said baffle and web, by terminating the pressure input line 14 at an open delivery end spacedly adjacent the baffle 23 within the chamber just noted, by continuing supply of fluid pressure input to the turbine in the head 11 through a supplementary flow line 14' having an intake end, screened as at 24, within the barrel chamber spaced laterally from the line 14 and axially offset toward the web 13 away from the delivery end of said latter line, by sealing the lines 14', 15 and 17 to the baffle 23 at their intersection thereof, and by charging the barrel chamber between the web 13 and baffle 23 with appropriate fibrous material 25, such as wicking, permeable to fluids and absorptive of oils. Organized as shown and described, the improvements of the invention are conditioned to function with desired effect through introduction to the fibrous charge 25, as through the exterior nipple of the line 14 exposed when the thimble 20 is uncoupled from the barrel 10, of suitable lubricating oil in an amount to saturate said charge, whereupon the assembly is fully prepared for customary use with the addition of an automatic, turbine-lubricating feature. Coupled, connected, and equipped for conventional use with oil present in the charge 25, fluid pressure input through the lines 21 and 14 to the barrel chamber circulates within the latter and acquires an oil vapor constituent which is transmitted therewith through the line 14' to and for lubrication of the turbine actuated by the combined flow; the oil vapor so acquired by the fluid flow adhering to the working components of the turbine with no entrained surplus adversely contaminating the exhaust to atmosphere through the line 15 and thimble 20.

Obviously, the improvement has further merit in that the charge 25 of fibrous material functions as a filter for the fluid pressure circulated therethrough and entraps moisture, entrained solids, and the like, capable of adversely affecting the turbine and its operation.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. The combination with a turbine-type dental handpiece having a tubular barrel portion and fluid pressure input and return lines longitudinally traversing the same in serving relation with a turbine operatively carried thereby, of means defining a closed chamber within said barrel portion about the said lines therethrough, an input line section disposed for delivery of fluid pressure interiorly of said chamber, a second input line section arranged for transmission of fluid pressure from said chamber and to the turbine, and a charge of fluid-permeable, oil-saturable material within the chamber across the path of fluid pressure flow between the input line sections therein.

2. The combination with a turbine-type dental handpiece having a tubular barrel portion and fluid pressure input and return lines longitudinally traversing the same in serving relation with a turbine operatively carried thereby, of means defining a closed chamber within said barrel portion about the said lines therethrough, an input line section disposed for delivery of fluid pressure interiorly of said chamber, a second input line section longitudinally overlapping and spaced laterally from said first section arranged for transmission of fluid pressure from said chamber and to the turbine, and a charge of fluid-permeable, oil-saturable material within the chamber across the path of fluid pressure flow between the input line sections therein.

3. The combination with a turbine-type dental handpiece having a tubular barrel portion and fluid pressure input and return lines longitudinally traversing the same in serving relation with a turbine operatively carried thereby, of means defining a closed chamber within said barrel portion about the said lines therethrough, an input line section disposed for delivery of fluid pressure interiorly of said chamber, a second input line section longitudinally overlapping and spaced laterally from said first section arranged for transmission of fluid pressure from said chamber and to the turbine, a screen shrouding the intake end of said second input line section, and a charge of fluid-permeable, oil-saturable material within the chamber across the path of fluid pressure flow between the input line sections therein.

4. In a turbine-type dental handpiece having a tubular barrel portion mounting a turbine at one end and seal-closed at its other end about fluid pressure input and return lines longitudinally therethrough in serving relation with the turbine, the self-lubricating improvement which comprises a baffle closing transversely of said barrel portion about said lines in a spacing from the barrel portion closed end effective to define a closed chamber interiorly of the barrel portion, a discontinuity of said input line within said chamber, and a charge of fluid-permeable, oil-saturable material within the chamber across the path of fluid pressure flow established therein by the discontinuous input line.

5. In a turbine-type dental hand piece having a tubular barrel portion mounting a turbine at one end and seal-closed at its other end about fluid pressure input and return lines longitudinally therethrough in serving relation with the turbine, the self-lubricating improvement which comprises a baffle closing transversely of said barrel portion about said lines in a spacing from the barrel portion closed end effective to define a closed chamber interiorly of the barrel portion, a longitudinally-overlapped, laterally-offset discontinuity of said input line within said chamber, and a charge of fluid-permeable, oil-saturable material within the chamber across the path of fluid pressure flow established therein by the discontinuous input line.

6. In a turbine-type dental handpiece having a tubular barrel portion mounting a turbine at one end and seal-closed at its other end about fluid pressure input and return lines longitudinally therethrough in serving relation with the turbine, the self-lubricating improvement which comprises a baffle closing transversely of said barrel portion about said lines in a spacing from the barrel portion closed end effective to define a closed chamber interiorly of the barrel portion, a division of the input line providing a first section disposed for delivery of fluid pressure within said chamber in longitudinally-overlapped, laterally-offset relation with the intake end of a second section arranged for transmission of fluid pressure from said chamber and to the turbine, a screen shrouding the intake end of said second input line section, and a charge of fluid-permeable, oil-saturable material within the chamber across the path of fluid flow between the input line sections therein.

References Cited in the file of this patent

UNITED STATES PATENTS 2,180,993     Monnier     Nov. 21, 1939